Feb. 23, 1971  G. B. WAGENFELD  3,564,612
CHEF'S CAP AND METHOD OF MAKING

Filed March 20, 1969  6 Sheets-Sheet 1

INVENTOR
GILBERT B. WAGENFELD
BY Edelson + Udell
ATTORNEY

Feb. 23, 1971  G. B. WAGENFELD  3,564,612
CHEF'S CAP AND METHOD OF MAKING
Filed March 20, 1969  6 Sheets-Sheet 2
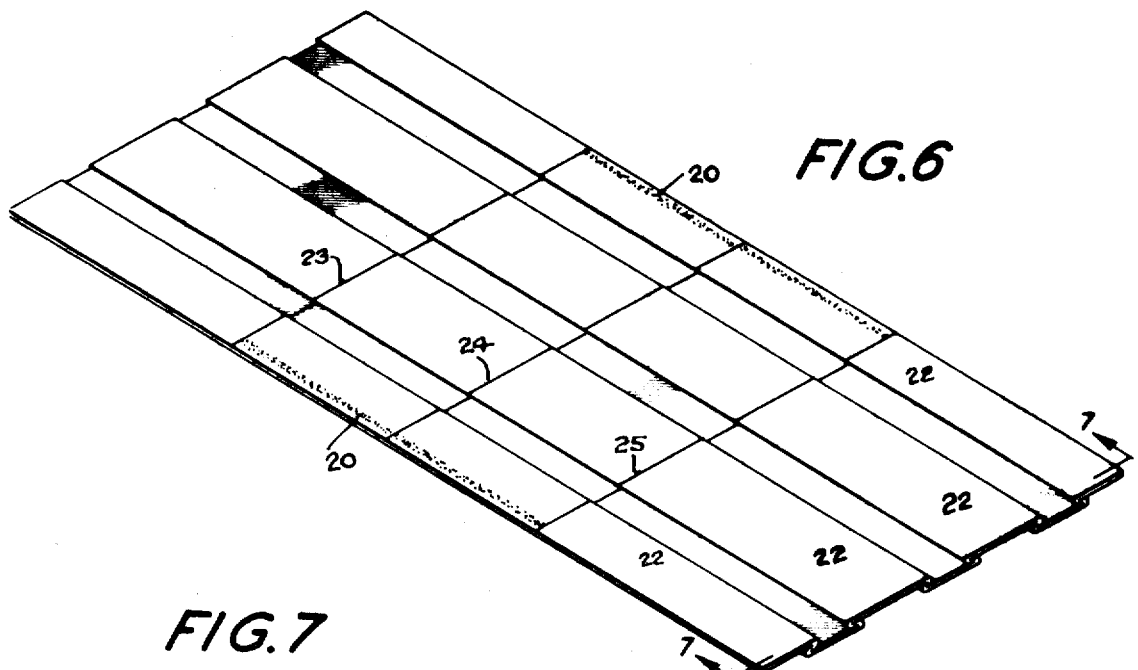
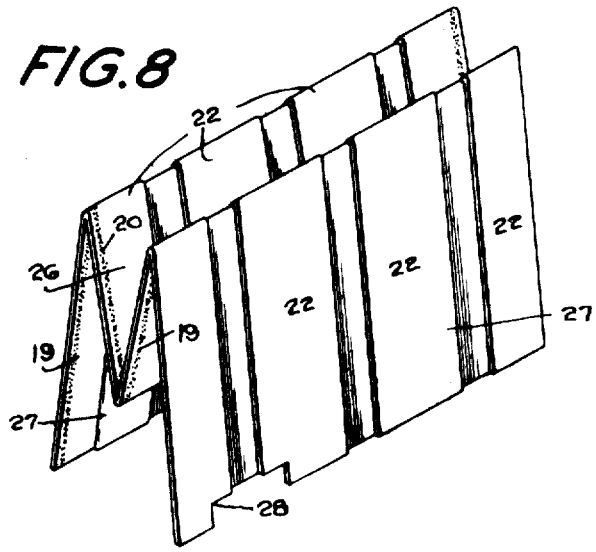
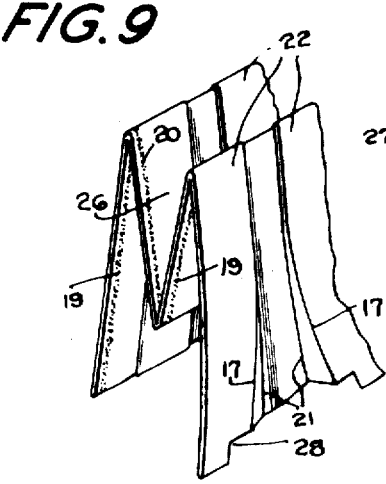
INVENTOR
GILBERT B. WAGENFELD
BY Edelson + Udall
ATTORNEY Feb. 23, 1971   G. B. WAGENFELD   3,564,612
CHEF'S CAP AND METHOD OF MAKING
Filed March 20, 1969   6 Sheets-Sheet 3
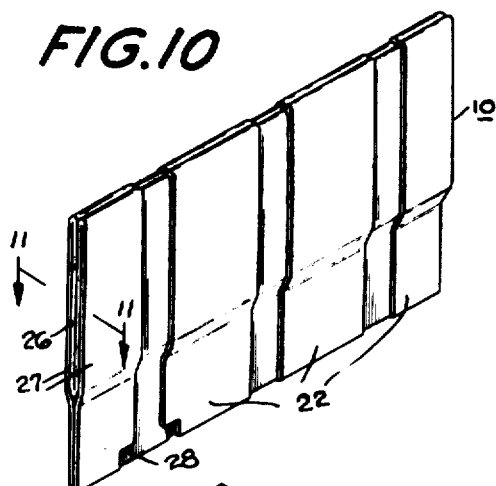
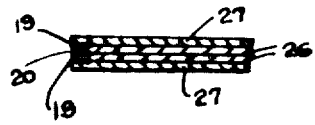
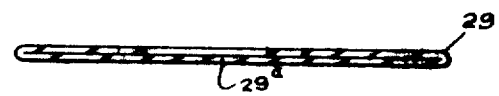
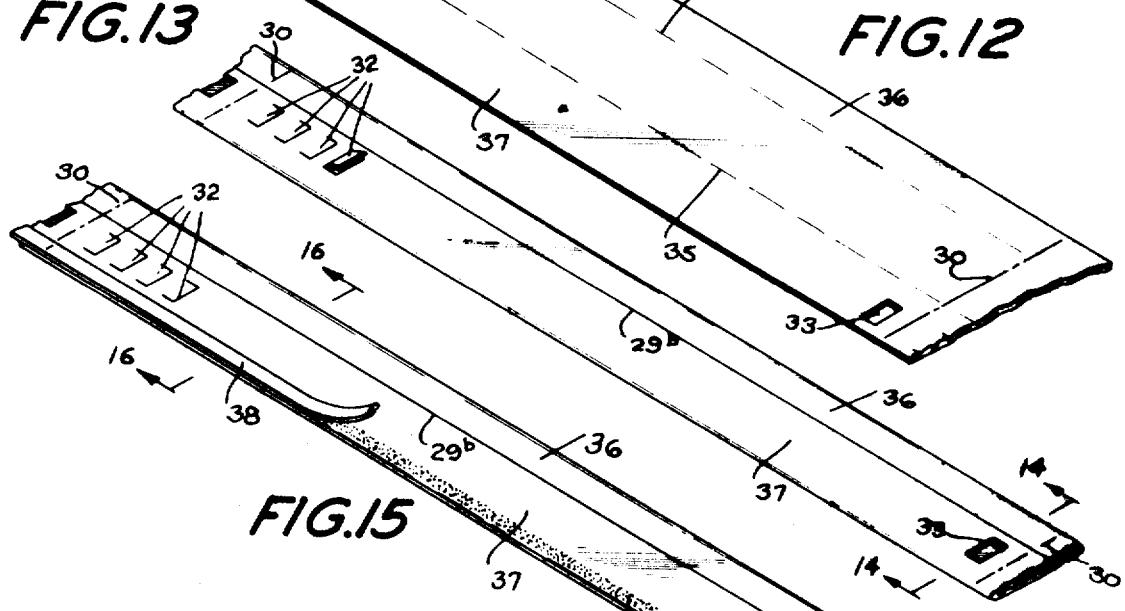
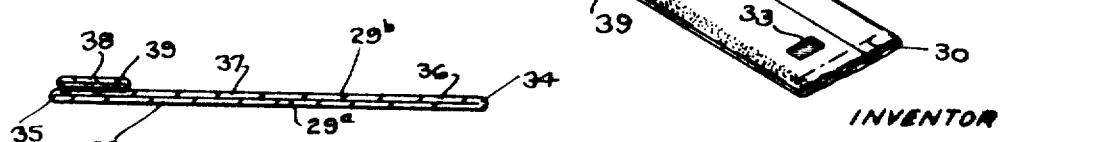
INVENTOR
GILBERT B. WAGENFELD
BY Edelson & Udell
ATTORNEY Feb. 23, 1971        G. B. WAGENFELD        3,564,612
CHEF'S CAP AND METHOD OF MAKING
Filed March 20, 1969        6 Sheets-Sheet 5
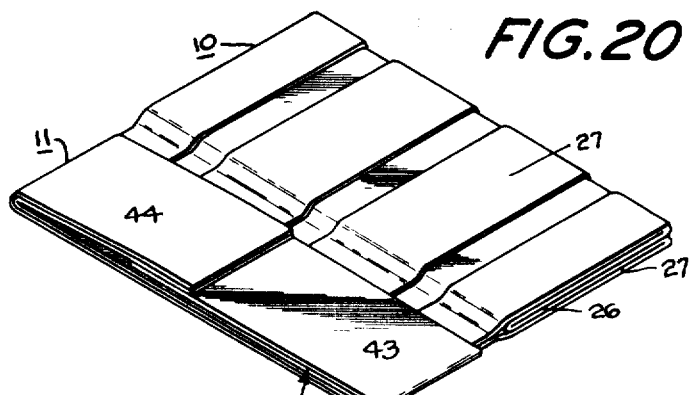//FIG.20
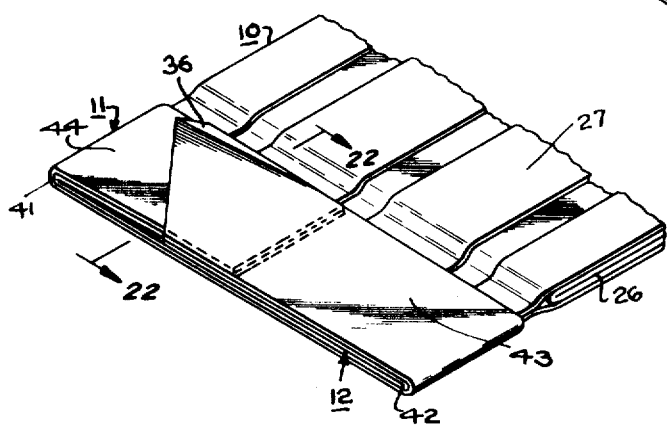//FIG.21
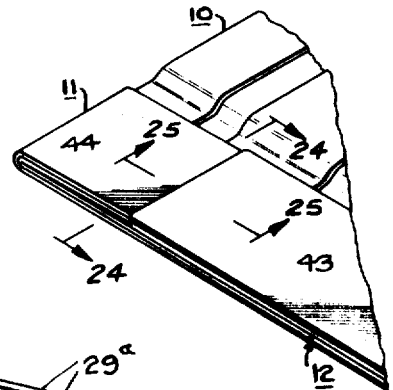//FIG.23
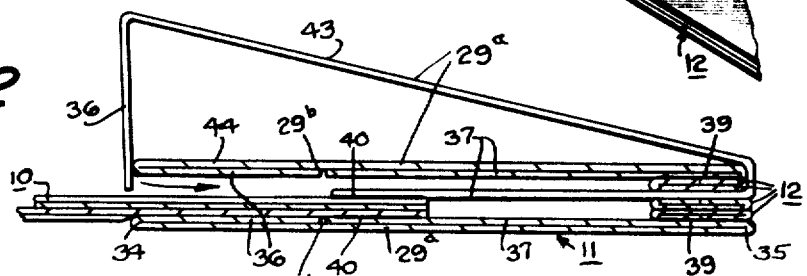//FIG.22
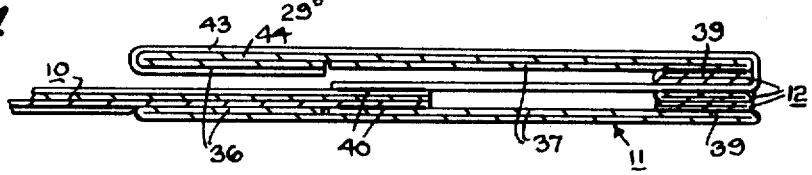//FIG.24
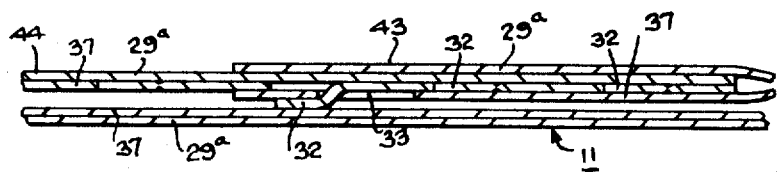//FIG.25
INVENTOR
GILBERT B. WAGENFELD
BY
Edelson + Udell
ATTORNEY

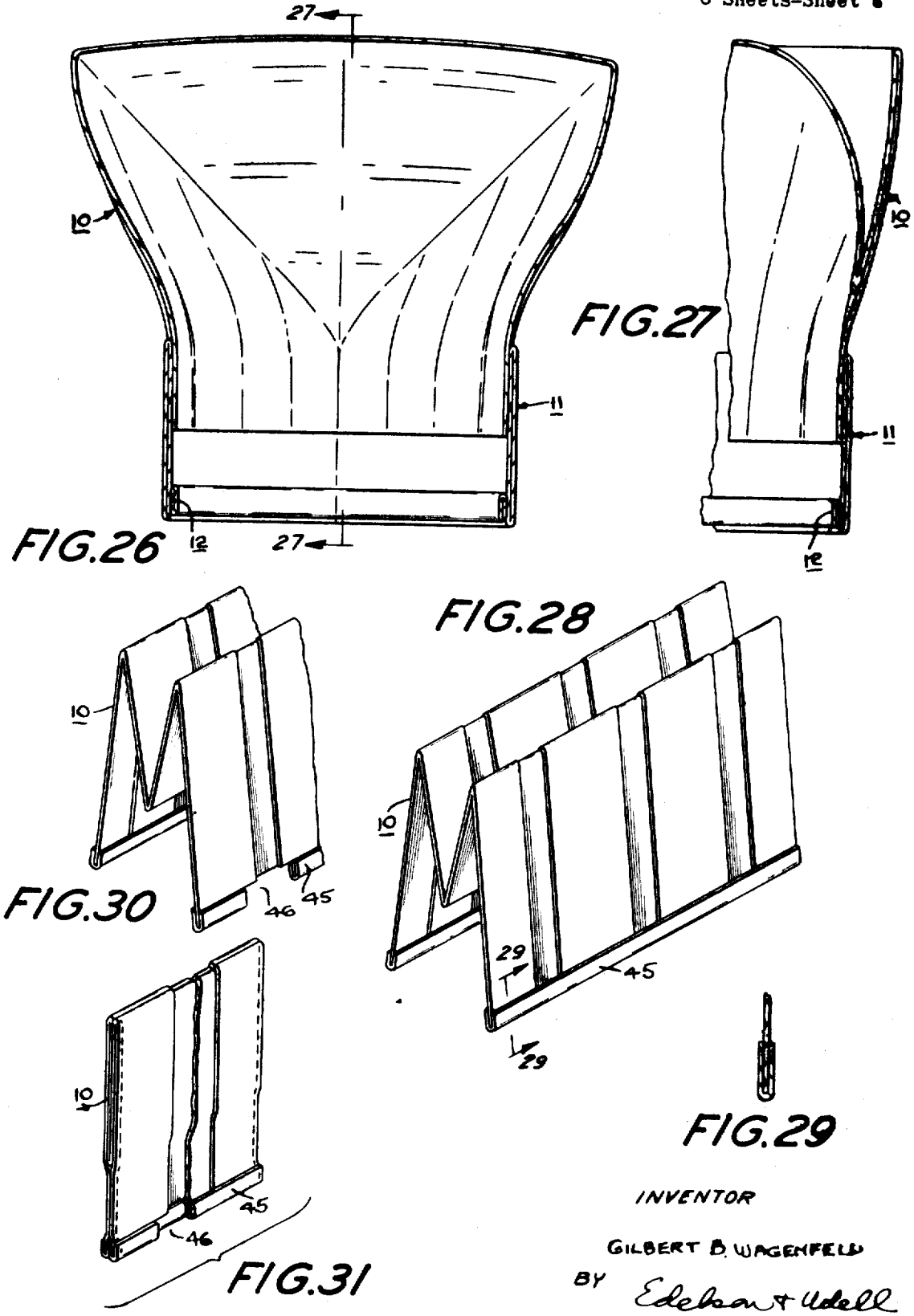

ered Feb. 23, 1971

3,564,612
CHEF'S CAP AND METHOD OF MAKING
Gilbert B. Wagenfeld, Bala Cynwyd, Pa., assignor to Cellucap Manufacturing Co., Philadelphia, Pa., a corporation of Pennsylvania
Filed Mar. 20, 1969, Ser. No. 808,850
Int. Cl. A42b 1/22
U.S. Cl. 2—197                                     32 Claims

ABSTRACT OF THE DISCLOSURE

A chef's type of hat having a crown piece of lightweight flexible material which is dovetail pleated, edge-sealed and so folded as to provide the same with an infolded central portion which may be outwardly pressed to form a closed top high rise crown for the hat. A head band formed of flexible but stiffer materal than that of the crown piece is permanently secured to the bottom portion of the crown piece and circumferentially embraces the same. The head band is adjustable in its head size and the crown piece is secured thereto with all of its pleat folds bonded together at their ends except within a limited area wherein the pleat folds are openable to provide for expansion of the crown girth in correspondence with expansion to head size of the head band. The head band may be interiorly provided with a sweat band. The hat is produced as a flat unit which may be expanded to shape by its wearer.

---

This invention relates generally to disposable hats and more particularly to the construction and method of producing a chef's hat having an expansible pleated crown permanently secured to a head band which is adjustable in size to fit the head of the wearer of the hat.

Among the principal objects of the present invention is the provision of a chef's type hat of such low cost that it may be disposed of when soiled or otherwise rendered unfit for further use and which may be economically fabricated of inexpensive flexible sheet material.

A particularly important object of the invention is to provide a chef's hat structure having a minimum number of component parts which may be readily produced and assembled rapidly and by quantity production methods into the form of complete hats at a very low unit cost of manufacture thereof.

Still another object of the invention is the production of a low cost disposable hat of the character described wherein the component parts thereof are of such form and so assembled as to enable the hat in its initially completed state to emerge as a flat unit so that the hats in quantity may be conveniently packed to achieve maximum saving in space required for shipment and storage of the same.

A further object of the invention is to provide the hat with a high rising closed top crown the girth of which is expansible to comfortably fit the head of the wearer without imposing any such strains and stresses upon the material of which the crown is formed as would tend to tear the same or otherwise impair the integrity of the hat as originally made.

Other objects and advantages of the present invention will be apparent more fully hereinafter, it being understood that the invention consists in the combination, construction, location and relative arrangement of parts, as well as in the method of producing and assembling the same as a final product, all as described in detail hereinafter, as shown in the accompanying drawings and as finally pointed out in the appended claims.

In the accompanying drawings which are illustrative of certain preferred embodiments of the present invention:

FIG. 4 is an enlarged view of the webbing with a portion thereof turned upon itself to expose the surface opposite that shown in FIG. 2a;

FIG. 6 is a perspective view of a section of the crown-forming webbing cut to a predtermined length requisite to form the crown portion of the hat, the same being shown folded upon itself to provide the dove-tail pleats which permit expansion of the crown into the shape shown in FIG. 1;

FIG. 7 is a transverse section view of the crown-forming blank as taken along the line 7—7 of FIG. 6;

FIG. 8 is an external surface view of the dove-tail pleated blank of FIG. 6 transversely folded upon itself with one end thereof notched as shown;

FIG. 9 is a view similar to FIG. 8 showing the notched portion thereof transversely expanded;

FIG. 10 is a perspective view showing the crown portion of the hat in its flat folded form and condition ready for assembly with the head band portion of the hat shown in FIG. 1;

FIG. 11 is a sectional view as taken along the line 11—11 of FIG. 10;

FIG. 12 is a perspective view of a section of sheet material cut from a web thereof of indeterminate length from which the head band of the hat is formed;

FIG. 13 is a perspective view of the head band stock shown folded upon itself;

FIG. 14 is a transverse sectional view as taken along the line 14—14 of FIG 13;

FIG. 15 is a view similar to FIG. 13 showing application of a sweat band strip to the folded head band stock;

FIG. 16 is a transverse sectional view as taken along the line 16—16 of FIG. 15;

FIGS. 20, 21 and 23 respectively illustrate the successive steps of interfolding into telescopic relation the opposite relatively movable end portions of the head band;

FIG. 22 is a transverse sectional view as taken along the line 22—22 of FIG. 21;

FIGS. 24 and 25 are transverse and longitudinal sections respectively of the hat in the regions of the telescoped portions of the hat head band.

Figure 1:
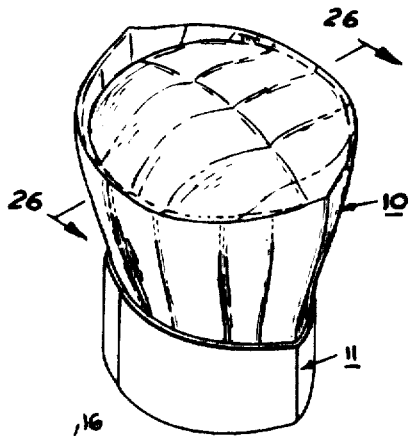
FIG. 1 is a perspective view of a chef's hat as constructed in accordance with and embodying the principles of the present invention, the same being shown expanded into wearable form.

FIG. 26 is a sectional view of the expanded chef's hat as taken along the line 26—26 of FIG. 1;

FIG. 27 is a sectional view of the expanded hat as taken along the line 27—27 of FIG. 26;

FIG. 28 is a view generally corresponding to FIG. 8 showing a modified construction of the crown portion of the hat of the present invention;

FIG. 29 is a sectional view as taken along the line 29—29 of FIG. 28; and

FIGS. 30 and 31 are further views illustrative of the modified construction of the hat crown piece.

Referring now to the drawings and more particularly to FIGS. 1, 26 and 27, the chef's hat of the present invention consists basically of three parts, namely, an expansible crown piece 10 which may be formed of flexible paper stock or of flexible crinoline, both of which materials conventionally employed in the construction of disposable paper hats and caps, a head band 11 of relatively stiff material, such as cardboard. Also conventionally employed in the art to which this invention relates is a sweat-band 12 of moisture-absorbing tissue material secured as a liner to the inner surface of the head-band just above the lower edge thereof. These three basic parts of the chef's hat are respectively formed and then permanently secured together as hereinafter described to produce a chefs hat in which, as a manufactured product, both the crown piece 10 and the head-band 11 are folded into flattened, compact form as shown in FIGS. 18 to 21 to provide a unit which may be conveniently packaged in quantity for shipment and storage and which may be easily expanded into shape by the user with its head band adjusted to comfortably fit about the head of the wearer of the hat.

Describing first the operation of constructing the crown piece 10 of the hat, reference is had to FIGS. 2 to 10 which show that the crown pieces are formed out of a continuously running web 13 of suitable sheet material, such as paper or crinoline, of a predetermined uniform width. This web 13 of the crown piece stock is provided at predeterminedly spaced intervals along the length thereof with a plurality of transversely spaced areas or "squares" of a thermo plastic adhesive which is reactivated upon application of heat and pressure as a bonding medium. These "squares" of the adhesive are so applied to the opposite surfaces of the web 13 along transversely extending cutting lines 15 as to provide the web when it is severed along these lines with a plurality of spots of adhesive spaced transversely along the opposite ends of each length of web cut thereof. Each unit length cut out of the web 13 along the transverse lines 15 thereof constitutes a single blank 16 from which the crown piece 10 is formed. The transversely extending parallel cutting lines 15 are uniformly spaced along the length of the continuously running web 13 to provide when the web is successively cut along these lines, by a suitable cutting die or mechanism, a plurality of crown piece blanks 16 of the same predetermined length.

The transversely spaced adhesive squares 14 at one end of each blank 16 are respectively longitudinally alined with the corresponding squares at the opposite end of the blank, each pair of the longitudinally alined squares being so disposed in straddling relation to a longitudinally extending fold line 17 as to provide on one surface of the blank 16 a plurality of adhesively coated areas 18a which are respectively disposed in juxtaposed offset relation to a plurality of adhesively coated areas 18b on the other or opposite surface of the blank.

Figure 2A:
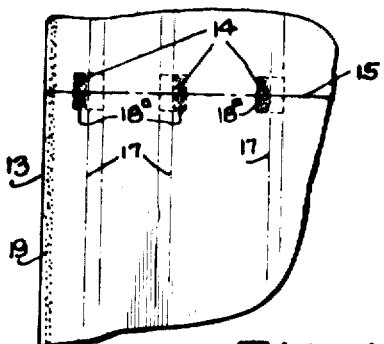
FIG. 2a is an enlarged fragmentary plan view of the web shown in FIG. 2.
Figure 2:
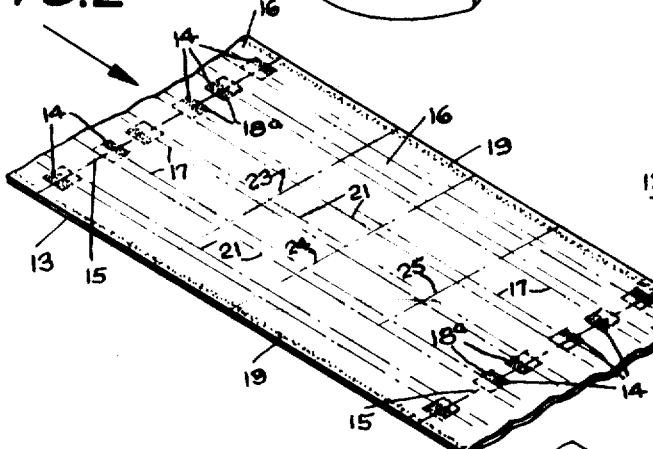
FIG. 2 is a view showing a section of sheet material cut from a web thereof of indeterminate length from which the expansible crown portion of the hat is formed, the section in this figure being disposed to show the inside surface of the crown-forming material.
Figure 4:
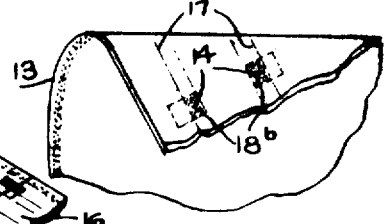
Figure 3:
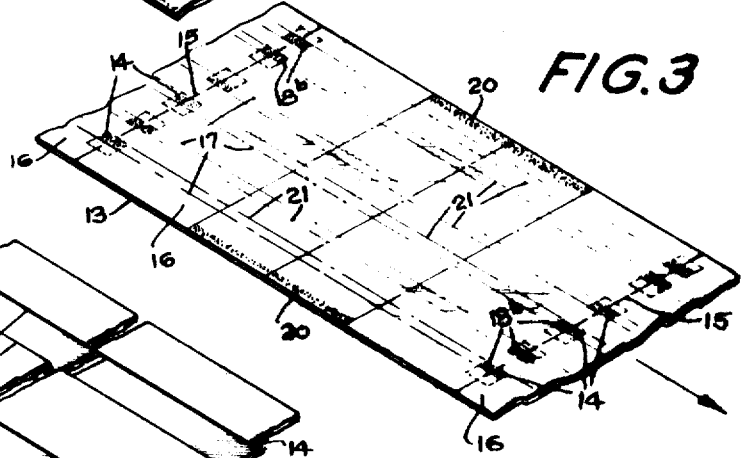
FIG. 3 is a view showing the opposite or outside surface of the crown-forming material.

Thus, as shown in FIG. 2, the top surface of the crown piece blank 16 which constitutes the inner face of the crown piece is provided at each of its opposite ends, that is, inwardly of the transversely extending severance lines 15—15, with a spot 18a of adhesive located to one side of each longitudinally extending fold line 17 in contiguous relation thereto. At the same time, the bottom surface of the crown piece blank 16, which constitutes the outer face thereof, is provided (see FIG. 3) with the spots 18b of adhesive so located relatively to the fold lines 17 as to be laterally offset from the spots 18a applied to the opposite surface of the crown piece web.

This pattern of adhesive spots is repeated along the full length of the web 13 of the crown piece stock so that each crown piece blank 16 cut therefrom is provided with its full complement of the adhesive spots as above described on both of its opposite surfaces.

In addition to the "squares" of adhesive applied to the opposite surfaces of the web 13, there is applied to the top surface thereof (FIG. 2) which forms the inner face of the crown piece 10, a pair of lines 19—19 of adhesive each of which runs continuously along each side edge of the web 13 the full length thereof. At the same time there is applied to the bottom surface of the web 13 (FIG. 3) which forms the outer face of the crown piece blanks, a pair of lines 20—20 of adhesive which respectively run along opposite side edges of web 13 from terminal points spaced equidistantly inwardly of successive pairs of the transversely extending cutting lines 15, i.e., of the opposite ends of each crown piece blank 16 cut out of the continuously running length of the web. These longitudinally spaced lines 20—20 of adhesive are respectively in registry with the continuous lines 19—19 of adhesive applied to the opposite face of the blank 16. As in the case of the adhesive "squares," the patterns of the adhesive lines 19—19 and 20—20 applied to the opposite surfaces of the crown piece blank is repeated along the full length of the web 13 so that each blank is provided with a full complement of the side edge adhesive lines.

Figure 5:
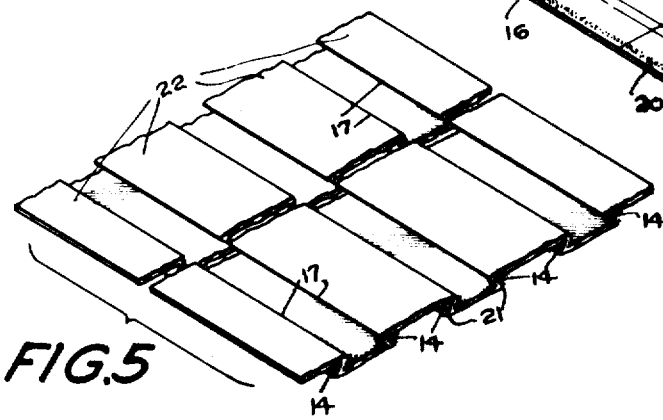
FIG. 5 is a perspective view of the crown-forming webbing showing the same partially folded to provide a plurality of transversely spaced dove-tail type pleats extending parallel relation lengthwise of the webbing.
Figure 17:
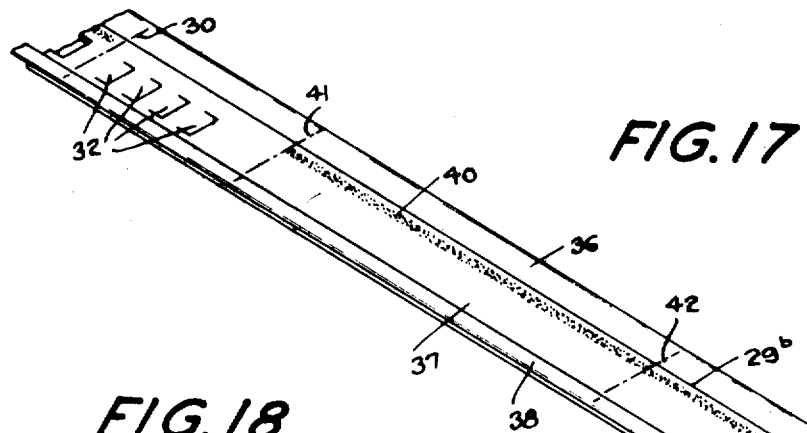
FIG. 17 is a view similar to FIG. 16 showing the head band stock in its final form for assembly with the crown portion of the hat.

The continuously running web 13 after having been coated on its opposite surface with the end "squares" and edge lines of any desired adhesive, such as glue or any suitable reactivatable thermoplastic adhesive, may then be longitudinally reversely folded upon itself along the hereinbefore mentioned fold lines 18 and additional closely related longitudinally extending parallel fold lines 21 to provide the web 13 with a plurality of transversely spaced dove-tail pleats 22, as shown partially formed in FIG. 5 and completely formed in FIG. 6. By this dovetail folding operation and upon application of heat and pressure along the fold lines 17 and 21, the overlying layers of the folded paper will be adhesively bonded together in the regions of the adhesive "squares," and thereupon the dovetailed folded web may be transversely cut along the severance lines 15 to provide a series of individual dove-tail pleated crown piece blanks as shown in FIG. 6 in each of which the opposite ends of the pleats are bonded to retain the blanks each in its folded state.

Subsequent to the bonding of the dove-tail pleats at the opposite ends of each crown piece blank section of the web 13 and either prior to or after severance of the crown piece blank from the web, the latter is scored or creased along three transversely extending lines 23, 24 and 25 located centrally between successive pairs of the cutting lines 15. Thus, each crown piece blank 16 cut from the web 13 is provided with a set of these crease lines 23, 24 and 25 to facilitate its being transversely folded upon itself, as in FIG. 8, into its final flattened form shown in FIG. 10. In this latter flat-folded condition of the dove-tail pleated crown piece, the central portion 26 thereof is infolded and extends downwardly between a pair of embracing side panel portions 27—27 to provide a unit which is of M-shaped longitudinal cross-section.

As most clearly appears in FIGS. 8, 9 and 10, one end of the dove-tail pleated crown piece is notched out, as at 28, to release against unfolding restraint the opposite folds formed between the two dove-tail pleates which immediately adjoin one side edge of one of the panel portions 27—27 of the crown piece. As illustrated, this notch 28, which is provided for a purpose appearing hereinafter, is located immediately adjacent that end of the crown piece which forms either the front or rear end thereof when assembled as part of the completed hat shown in FIG. 1. Preferably, this notch 28, which frees the pleated folds included within the notched area of any bonding adhesive, is formed while the crown piece blank 16 is in its adhesively bonded, flat condition shown in FIGS. 6 and 7. The notch may be formed by die-cutting the crown piece blank either simultaneously as each blank is severed from the web along the transverse cutting line 15 or after the blank has been cut from the web, and is ready to be reversely folded into its flattened form shown in FIG. 10.

The crown piece unit shown in FIG. 10 is completed as a flat component of the hat by sealing together its overlying edge portions at the opposite edges thereof by the lines 19—19 and 20—20 of adhesive provided for each crown piece blank 16. In this completed form of the crown piece, the opposite edges of the infolded portion 26 thereof are sealed together by the lines of adhesive 20—20 and to the outer side panel portions 27—27 by the lines of adhesive 19—19. In this completed form of the crown piece unit, the opposite sealed-up ends thereof respectively constitute the fore and aft ends of the expanded crown 10 of the hat, while the infolded portion 26 thereof, when pressed upwardly from between the side panel portions 27—27, forms the top of the hat.

As in the case of the crown piece part of the hat, the head band 11 thereof is also formed of sheet material cut out of a continuously running web 29 thereof (FIG. 12) of indeterminate length but of predetermined uniform width. The material of which the head band is formed is of heavier weight and relatively stiff as compared to the quite flexible material of the crown piece, it being preferred to employ for the head band stock lightweight cardboard or the like which is sufficiently flexible when formed into shape to comfortably fit about the head of the hat wearer.

The web 29 of the head band forming material is adapted to be successively cut along the transversely extending cutting lines 30 which are equidistantly spaced apart to provide head band blanks 31 of predetermined uniform length. Each of these blanks 31 is die cut to provide the same along one side edge thereof with a plurality of locking tabs 32 at one end of the blank and with a single slot 33 at its opposite end for selectively receiving any one of the tabs 32 whereby the head band may be adjustably locked into any desired one of several different head sizes.

The continuously running length of the head band web 29 is creased or scored along a pair of longitudinally extending parallel fold lines 34 and 35 to facilitate its being folded upon itself into its form shown in FIG. 13, in which condition the folded head band web 29 is provided with a pair of flaps 36 and 37 which overlie the central body portion 29a thereof with their longitudinally extending free edges meeting along the line 29b. These flaps 36–37 constitute the inner face of the head band, it being noted that the locking tabs 32 and the tab-receiving slot 33 are disposed centrally between the opposite edges of the flap 37.

Preferably, the head band is provided upon its inner face adjacent the bottom edge thereof with a suitable sweat band 12 formed from a strip 38 of any suitably soft moisture-absorbing material. This sweat band strip 38, when provided, is secured, as by a line of adhesive 39, to the exposed surface of the flap 37 after it has been folded and prior to severence of the head band blank 31 from the continuously running length of the folded head band web, as is best shown in FIG. 15.

At the same time that the sweat band is applied in continuous strip form to the infolded head band flap 37, the latter is coated with a line 40 of adhesive extending lengthwise from a point spaced inwardly of the group of locking tabs 32 to the transverse severence line 30 located just beyond the slot 33 provided for said group of tabs, which line 40 of adhesive is repeated for each head band blank cut from the continuously running web thereof.

Figure 18:
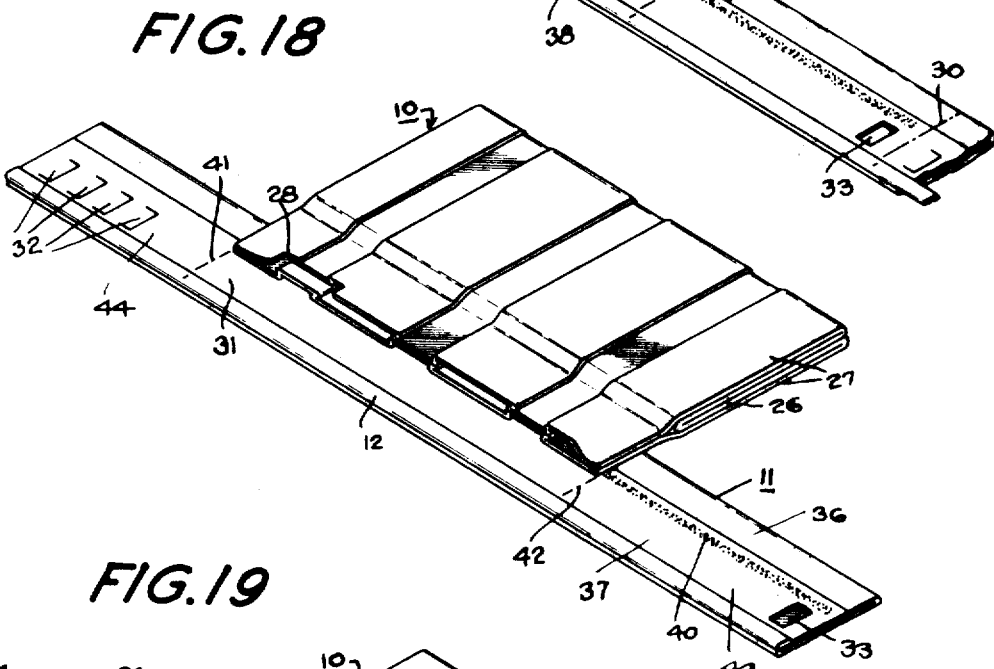
FIGS. 18 and 19 are views respectively showing the successive steps of adhesively securing together the crown portion and the head band of the hat.
Figure 19:
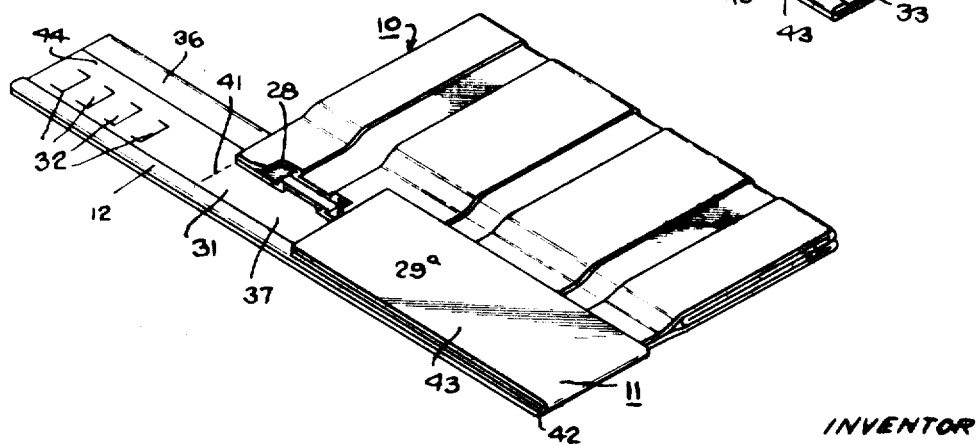

As most clearly appears in FIGS. 17 to 20, each folded head band blank 31 cut from the web 29 is of a predetermined uniform length which is more than twice the width of the crown piece formed as previously described and shown in FIG. 10. Each unit length of the folded head band is transversely scored or creased along a pair of parallel lines 41–42 spaced apart a distance equal to the width of the flat-folded crown piece to facilitate folding of the head band about the crown piece as shown in FIGS. 19 and 20 with opposite end portions of the head band disposed in overlapping relation upon one side of the crown piece.

Preferably, the several crown pieces preformed to their shape as shown in FIG. 10 are successively applied and secured to the continuously running length of the folded head band stock, as in FIG. 18, with the notched-out sides of the crown pieces presenting upwardly, i.e. away from, the surface of the head band stock to which they are adhesively secured. The positionment of each crown piece upon each unit length of the head band is such that the opposite sides of each crown piece are respectively in substantial registry with the head band crease lines 41–42 and the bottom edge portion of the un-notched side of the crown piece overlies the line 40 of adhesive by which the latter side of the crown piece is bonded to the infolded flap 37 of the head band as shown. In this condition of assembly, opposite portions 43 and 44 of each head band section extend freely beyond the corresponding ends of the crown piece unit, and the head band stock may then be cut to unit length along the severence lines 30.

Either before or after each head band section with the crown piece secured thereto as just described is cut to unit lengths, the freely extending portion 43 of the head band is folded about its crease line 41 over the top surface of crown piece and secured thereto by the line 40 of adhesive. It will be noted that this adhesively-secured, folded-over portion 43 of the head band extends to a point short of the notch 28 provided in the dove-tail pleated crown piece so that the two end-most pleat folds of the crown piece are free to be pulled open for expanding the girth of the crown piece as may be required upon adjustment of the head band to a desired enlarged size. Also, it will be noted further that the central main body portion 29a of the head band and its infolded flap 36 are relatively free of the adhesively bonded portions of the crown piece and head band, and thus, when the freely extending portion 44 of the head band, which is in the form of a flattened tube, is folded about its crease line 41, it may be telescopically engaged with its overlapping portion 43 of the head band.

To effect this telescopic interengagement of the overlapping portions 43 and 44 of the hat band, the opposite longitudinally extending folded edges of the portion 44 are respectively tucked between the infolded flaps 36 and 37 and the relatively fixed main body portion 29a of the overlapping head band portion 43, all as is most clearly shown in FIGS. 21 and 22 to form the complete flat folded hat partially shown in FIG. 23.

The head band 11 of the completed hat may be locked to size by interengagement of any one of the several locking tabs 22 thereof with the tab-receiving slot 33. Since the pleat folds of the crown piece 10 are free to be pulled open in the region of the notch 28 in the crown piece, it will be seen that when the telescoped portions 43 and 44 of the hat band are pulled apart sufficiently to enlarge the head size of the band to fit the head of the hat wearer, the crown piece will be expanded in the region of the notch 28 to correspondingly enlarge the girth size of the crown piece. Of course, the head band will be locked into its adjusted size by selective engagement with the tab-receiving slot 33 of the requisite locking tab.

In use of the hat, it is expanded from its flat-folded form partially shown in FIG. 23 into its shape as illustrated in FIGS. 1, 26 and 27 with the infolded central portion of the crown piece 10 pressed outwardly to provide the characteristics high crown shape of a chef's hat.

Any suitable flexible sheet material may be employed for fabrication of the crown piece, such as lightweight paper, plastic and other unwoven sheet material made of natural or synthetic fibers as well as woven fabrics such as crinoline and the like. The head band may also be made of any desired flexible sheet material having the requisite stiffness and weight to serve its intended purpose.

Although the construction of the hat of the present invention is designed especially for automatic manufacture thereof out of continuous running lengths of sheet material as hereinbefore described, it will be understood, of course, that each hat may be individually fabricated by pre-forming its component parts and then manually assembling the same. Also, any desired technique may be employed for permanently bonding together those parts of the hat which are not intended to be separable. For example, in place of applying the "squares" of adhesive to opposite faces of the sheet material of which the crown piece is formed as hereinbefore described, the sheet material may first be dove-tail pleated following which the opposite ends of each fold may have applied thereto an adhesive which permeates through all of the overlying layers of the folds to bond them together at the point of application of the adhesive. This is a particularly effective procedure where crinoline or other porous material, such as unwoven synthetic fibre stock, is employed for producing the crown piece unit.

Alternatively, the ends of the dove-tail pleat folds may be locked together by a row of stitching or of staples (not shown) or by applying thereto a binding strip 45 extending across the full width of each end of the dove-tail folded crown piece unit, as shown in FIGS. 28 to 31. These strips 45, which may be glued, stitched or otherwise secured as bindings about opposite ends of the pleated crown piece, is cut away on one end of the crown piece, as at 46, during the operation of notching the crown piece to free the folds of the end-most pleats for expansion of the crown piece as hereinbefore described.

It will be understood that the present invention is susceptible of various other changes in construction and procedure without departing from the general principles or real spirit thereof, and it is accordingly intended to claim the same broadly, as well as specifically, as indicated by the appended claims.

What is claimed as new and useful is:

1. A hat of the charatcer described comprising a crown piece made of a rectangular blank of flexible sheet material having a plurality of transversely spaced longitudinally extending pleats, said pleated blank being transversely folded upon itself about three parallel fold lines spaced from one another providing a pair of side wall portions embracing an infolded central portion extending downwardly between said side wall portions a distance substantially less than the length of said side wall portions whereby the latter extend downwardly freely beyond the bottom edge of said infolded central portion, the coincident edges of said side wall portions and said infolded central portion at opposite ends thereof being secured together along the full length of said side wall portions, an adjustable head band of flexible, relatively stiff material extending in embracing relation about said side wall portions of the crown piece with its upper edge spaced below the bottom edge of said infolded portion of the crown piece, said head band having a central portion overlying one of said side wall portions and a pair of overlapping end portions overlying the other of said side wall portions of said crown piece, said central portion and one of said overlapping end portions of said head bend being respectively secured to the bottom edges of said crown piece side wall portions in overlying relation to the pleated folds thereof along a line extending parallel to and disposed between the bottom edges of said head band and said infolded central portion of the crown piece, the other one of said overlapping end portions of the head band being wholly unsecured to and thus entirely free of the crown piece for movement relatively to the latter, and means for adjustably interconnecting said overlapping end portions of said head band to vary the head size thereof.

2. In a hat as defined in claim 1 wherein said crown piece and the head band secured thereto have their opposite sides flat-folded together and may be expanded from said flat-folded condition into substantially circular form to fit upon the head of a wearer of the hat.

3. In a hat as defined in claim 2 wherein said infolded central portion of the crown piece is extendable outwardly from between the side wall portions thereof providing a high rise, completely closed top for the expanded hat free of any seams or joints extending cross-wise thereof.

4. In a hat as defined in claim 1 wherein all but a limited number of the pleats have their folds locked together at opposite ends thereof whereby to restrain all but said limited number of pleats from unfolding along the line of juncture of said crown piece with said head band.

5. In a hat as defined in claim 4 wherein the pleat folds not locked together are present in only one of said side wall portions of the crown piece.

6. In a hat as defined in claim 4 wherein the pleat folds not locked together are present in only that one of said side wall portions of the crown piece which underlies the overlapping portions of the head band.

7. In a hat as defined in claim 1 wherein the crown piece is provided with means permitting expansion thereof substantially along the line of juncture of said crown piece with said head band.

8. In a hat as defined in claim 1 wherein a pair of the pleat folds of the crown piece in the region thereof which underlies that end portion of the head band which is not secured to the crown piece are free to be folded and unfolded to vary the girth of the crown piece in accordance with adjustment in size of the head band, and wherein all of the remaining pleat folds have their opposite ends locked together to preclude unfolding thereof throughout the region of juncture of said crown piece with said head band.

9. In a hat as defined in claim 1 wherein the bottom edge of one of said side wall portions of the pleated crown piece is provided with a notch extending crosswise of at least one of said pleat folds to terminate the same short of the terminal ends of the remaining pleat folds in both of said side wall portions, all of said remaining pleat folds being locked against unfolding along the lines of juncture of the crown piece with said head band, said shortened pleat fold being freely openable to increase the girth size of the crown piece.

10. In a hat as defined in claim 9 wherein said notch encompasses an adjoining pair of said pleat folds to render them free to be unfolded to increase the girth size of the crown piece.

11. In a hat as defined in claim 1 wherein said pleats are of dove-tail type each having a central panel the opposite longitudinal edges of which are correspondingly infolded to provide overlapping portions secured together against unfolding at the terminal ends of said folds, selected ones of said folds being free for unfolding in the region covered by the overlapping portions of the head band.

12. In a hat as defined in claim 1 wherein said head band consists of an outer panel and a pair of opposed inwardly folded top and bottom flaps overlying the inner surface of said outer panel, the said overlapping portions of the head band on one side of the hat being telescopically engageable and respectively provided with means for interlocking said telescopically engaged portions to an adjusted head band size.

13. In a hat as defined in claim 12 wherein the bottom edges of the pleated side wall portions of the crown piece of the hat are joined to said bottom flap of the head band respectively along said central portion thereof which overlies one of said side walls and along only that one of the telescopically engaged portions which overlies the other of said walls.

14. In a hat as defined in claim 13 wherein the terminal ends of all of the crown piece pleat folds encompassed by the portions of the head band which are secured to said opposite side wall portions of the crown piece are interlocked against unfolding at said terminal ends thereof.

15. In a hat as defined in claim 13 wherein the terminal ends of all of the crown piece pleat folds encompassed by the portions of the head band which are secured to said opposite side wall portions of the crown piece are adhesively secured against unfolding at said terminal ends thereof.

16. In a hat as defined in claim 13 wherein the terminal ends of all of the crown piece pleat folds encompassed by the portions of the head band which are secured to said opposite side wall portions of the crown piece are hemmed against unfolding at said terminal ends thereof.

17. In a hat as defined in claim 1 having a sweat band secured to the inner surface of the head band adjacent the lower marginal edge thereof and extending along the full length thereof.

18. A method of continuously producing chef's type hats having intersecured separate crown piece and head band parts consisting of the steps of
  (a) applying lines of adhesive to opposite surfaces of a continuous web of constant width crown piece forming sheet material,
    (1) the lines of adhesive applied to one surface of the web being continuous along opposite side edge portions of the web and
    (2) the lines of adhesive applied to the other surface of the web being longitudinally spaced apart in discontinuous registry with said first mentioned continuous lines of adhesive,
    (3) the pattern of said lines of adhesive being repeated along the length of the web for each unit of length required for producing one of said crown pieces,
  (b) longitudinally pleating the said web by folding the same along transversely spaced, longitudinally extending parallel lines to provide a constant width crown web of indeterminate length having a plurality of transversely spaced pleats,
  (c) transversely cutting the pleated crown web along lines which are equidistantly spaced from the terminal ends of said discontinuous lines of adhesive to successively provide pleated crown piece blanks of predetermined unit length in each of which the discontinuous lines of adhesive extend lengthwise through approximately the middle third portion of each blank,
  (d) folding each of said pleated crown piece blanks along a plurality of spaced, transversely extending lines paralleling the cut ends of the blank to provide flat-folded units of substantially M-shaped longitudinal cross section,
  (e) sealing the edges of said flat-folded unit together at each of its opposite sides along the lines of adhesive thereto applied,
  (f) forming from a web of head band forming material of constant width and indeterminate length a succession of head band blanks each of a unit length greater than the overall width of the flat-folded crown piece unit formed as set forth in steps (a) to (e) hereof,
    (1) each of said head band blanks having a central portion of a length equal to the width of the crown piece and a pair of oppositely extending end portions adapted respectively to be folded about the opposite edges of the crown piece into overlapping relation,
  (g) applying discontinuous lines of adhesive to said head band web to provide each unit length thereof with adhesive extending continuously along said central portion of the head band blank and one of said oppositely extending end portions thereof,
  (h) cutting the head band web to unit length along transversely extending, longitudinally spaced lines each located in closed proximity to one end of the line of adhesive applied as in step (g) to the head band web,
  (i) adhesively securing said central portion of the head band blank to the bottom end of one of the side wall portions of the crown piece and said last-mentioned end portion of the head band blank to the corresponding end of the opposite side wall portion of the crown piece, and
  (j) folding the adhesive-free end portion of the head band about said crown piece into overlapping engagement with that end portion of the head band which is secured to the crown piece.

19. In a method as defined in claim 18 wherein the discontinuous lines of adhesive extend through approximately the middle third length of each crown blank cut from the web of the crown piece forming material and the transverse fold lines set forth in the aforesaid step (d) respectively intersect the terminal ends and the central point of said lines of adhesive extending through the said middle third length of each crown piece blank.

20. In a method as defined in claim 18 wherein the crown piece web is reversely folded along longitudinally extending, transversely spaced parallel lines to provide the same with dovetail type pleats which alternately present in opposite directions with reference to the plane of the crown piece web.

21. In a method as defined in claim 18 wherein at least one of said pleat folds at one end of the crown piece blank is freely openable while all of the remaining pleat folds at both ends of the crown piece blank are held secured against unfolding.

22. In a method as defined in claim 18 wherein the pleat folds at their opposite ends are securely interlocked to prevent unfolding of the folds at points closely adjoining the opposite ends of the crown piece web and wherein one end of the crown piece web is notched to cut out of the crown piece we bthe interlocked end of at least one of said pleat folds to render the same free to be unfolded for transverse extension of one side wall portion of the crown piece.

23. In a method as defined in claim 22 wherein the notching of said crown piece web is such as to encompass a pair of adjoining pleat folds located in the region of the crown piece side wall portion which is covered by the overlapping end portions of the head band.

24. In a method as defined in claim 18 wherein the web of head band forming material is longitudinally folded upon itself to form a flattened member having a pair of oppositely infolded coplanar flap portions forming the inner surface of the head band, the flap portions of one of the overlapping end portions of the head band being spreadable apart to facilitate telescopic interengagement of said overlapping end portions of the head band.

25. In a disposable chef's hat, a crown piece made of a single rectangular blank of flexible sheet material accordion folded into M-shape about a plurality of spaced parallel horizontal lines extending cross-wise of the blank whereby the same is provided with a pair of outer panels embracing an infolded pair of inner panels, said outer panels having freely extending horizontal bottom edges coincident with one another along a line spaced below the bottom edge of said inner panels and all of said panels having coincident side edges extending orthogonally with respect to said bottom edges forming first and second groups of side edges, said first group of side edges being permanently secured together and said second group of side edges being also permanently secured together to seal closed the opposite ends of the crown piece, said bottom edges of the outer pair of panels being free of securement to one another to define therebetween a central bottom opening for receiving the head of the wearer of the hat, said crown piece blank being provided with a plurality of pleats extending continuously from one to the other of said bottom edges in spaced parallel relation to said sealed ends of the crown piece, and a head band extending peripherally about said central bottom opening of the crown piece and secured to said bottom edges of said outer panels, said pleats above the line of securement of said head band to said outer panels being laterally extensible simultaneously as said infolded inner panels are expanded upwardly an doutwardly from between said outer panels whereby said crown piece may assume a substantially inverted truncated conical shape.

26. In a chef's hat as defined in claim 25 wherein all but a limited number of said pleats have their folds locked together along the bottom edges of said outer panels whereby to restrain all but said limited number of pleats from unfolding along the line of securement of the crown piece to said head band.

27. In a chef's hat as defined in claim 26 wherein said head-band is provided with means permitting expansion or contraction thereof within the limits of expansion or contraction afforded by the unlocked folds of the crown piece pleats.

28. In a chef's hat as defined in claim 25 wherein said pleats are each of dove-tail type having a pair of laterally spaced flat-folded portions joined together by an intervening web, the intervening webs between successive pairs of said flat-folded portions being alternately formed upon opposite faces of the pleated blank.

29. A method of continuously producing chef's type hats having intersecured separate crown piece and head band parts consisting of the steps of:
   (a) longitudinally pleating the said web by folding the same along transversely spaced, longitudinally extending parallel lines to provide a constant width crown web of indeterminate length having a plurality of transversely spaced pleats,
   (b) transversely cutting the pleated crown web along equidistantly spaced lines to successively provide pleated crown piece blanks of predetermined unit length,
   (c) folding each of said pleated crown piece blanks along a plurality of spaced, transversely extending lines paralleling the cut ends of the blank to provide flat-folded units of substantially M-shaped vertical cross section having a pair of outer panels embracing a pair of infolded inner panels,
   (d) permanently sealing together the marginal edges of said flat-folded unit at each of its opposite sides,
   (e) forming from a web of head band forming material of constant width and indeterminate length a succession of head band blanks each of a unit length greater than the overall width of said flat-folded M-shaped crown piece unit formed as set forth in steps (a) to (d) hereof,
      (1) each of said head band blanks having a central portion of a length equal to the width of the crown piece unit and a pair of oppositely extending end portions adapted respectively to be folded about the opposite sealed edges of the crown piece unit into overlapping relation,
   (f) applying discontinuous lines of adhesive to said head band web to provide each unit length thereof with adhesive extending continuously along said central portion of the head band blank and only one of said oppositely extending end portions thereof,
   (g) cutting the head band web to unit length along transversely extending, longitudinally spaced lines each located in close proximity to one end of the line of adhesive applied as in step (f) to the head band web,
   (h) adhesively securing said central portion of the head band blank to the bottom end of one outer panel of the crown piece unit and said last-mentioned end portion of the head band blank to the corresponding end of the opposite outer panel of the crown piece unit, and
   (i) folding the adhesive-free end portion of the head band about said crown piece into overlapping engagement with that end portion of the head band which is secured to the crown piece unit.

30. In a method as defined in claim 29 wherein at least one of said pleat folds at one end of the crown piece blank is freely openable while all of the remaining pleat folds at both ends of the crown piece blank are held secured against unfolding.

31. In a method as defined in claim 29 wherein the pleat folds at their opposite ends are securely interlocked to prevent unfolding of the folds at points closely adjoining the opposite ends of the crown piece web and wherein one end of the crown piece web is notched to cut out of the crown piece web the interlocked end of at least one of said pleat folds to render the same free to be unfolded for transverse extension of one side wall portion of the crown piece.

32. In a method as defined in claim 31 wherein the notching of said crown piece web is such as to encompass a pair of adjoining pleat folds located in the region of the crown piece side wall portion which is covered by the overlapping end portions of the head band.

References Cited

UNITED STATES PATENTS

| | | | |
|---|---|---|---|
| 1,247,415 | 11/1917 | Lattimore | 2—200 |
| 1,836,141 | 12/1931 | Wagenfeld | 2—200X |
| 2,329,539 | 9/1943 | Kingson | 2—197 |
| 3,292,183 | 12/1966 | Story | 2—200 |
| 3,348,239 | 10/1967 | Lamour | 2—197X |
| 3,390,405 | 7/1968 | Gruber | 2—197 |

FOREIGN PATENTS

| | | | |
|---|---|---|---|
| 567,143 | 5/1958 | Belgium | 2—197 |

PATRICK D. LAWSON, Primary Examiner

G. H. KRIZMANICH, Assistant Examiner